United States Patent [19]

Hertzen et al.

[11] Patent Number: 4,804,826

[45] Date of Patent: Feb. 14, 1989

[54] DEVICE FOR PREVENTING UNAUTHORIZED USE OF CREDIT CARDS AND LIKE DATA CARRIERS

[76] Inventors: Krister Hertzen, Linnégatan 75, Stockholm S-114 60; Hans Sjöblom, Magnus Stenbocksgatan 6, Lund S-222 24, both of Sweden

[21] Appl. No.: 88,106

[22] PCT Filed: Nov. 20, 1986

[86] PCT No.: PCT/SE86/00530

§ 371 Date: Sep. 4, 1987

§ 102(e) Date: Sep. 4, 1987

[87] PCT Pub. No.: WO87/03400

PCT Pub. Date: Jun. 4, 1987

[30] Foreign Application Priority Data

Nov. 20, 1985 [SE] Sweden ............................... 8505485

[51] Int. Cl.⁴ .......................... G06K 3/00; G06K 5/00

[52] U.S. Cl. .................................. 235/382; 235/380; 235/381

[58] Field of Search ........................ 235/380, 381, 382

[56] References Cited

U.S. PATENT DOCUMENTS 3,866,173 2/1975 Moorman ............................ 235/382

*Primary Examiner*—Harold I. Pitts

*Attorney, Agent, or Firm*—Shapiro and Shapiro

[57] ABSTRACT

The invention relates to a device for preventing unauthorized use of card- or disc-shaped proofs of legitimacy and/or data carriers, such as ATM cards, credit cards and flexible discs, comprising a cover or case-shaped device (1) or the like having at least one pocket or the like adapted to receive at least a portion of at least one card, disc, etc., actuators and control means (4) arranged in said pocket, said control means being adapted to control said actuators and preferably being of the code lock type and comprising one or more means which, when actuated in a certain sequence or in a certain combination, are adapted to control said actuators.

The novelty of the invention resides in that said actuators comprise means (**17, 20*x*, 27**) which are activatable when an attempt at gaining access is made without proper actuation of said control means and which, in the event of such an attempt at unauthorized access, are adapted to permanently mechanically damage said card, disc etc. and/or the data carried thereon.

8 Claims, 4 Drawing Sheets

Fig. 2
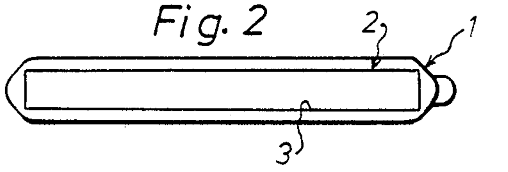
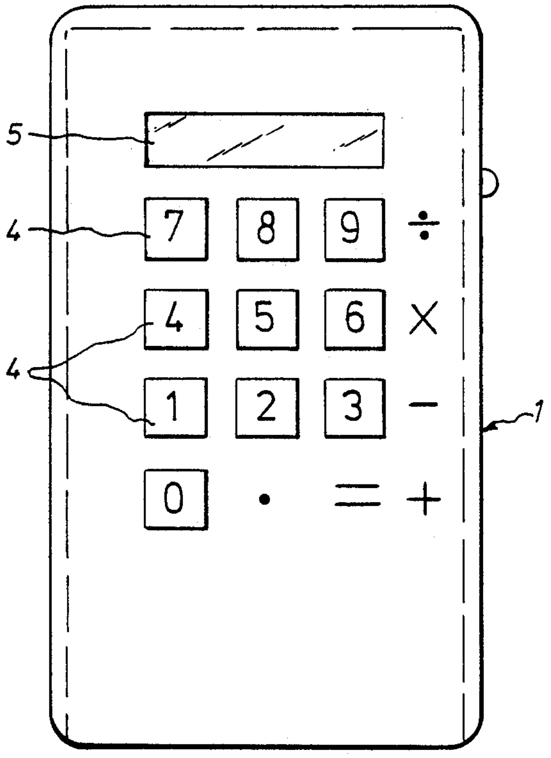
Fig. 1

DEVICE FOR PREVENTING UNAUTHORIZED USE OF CREDIT CARDS AND LIKE DATA CARRIERS

BACKGROUND OF THE INVENTION

The present invention relates to a device for preventing unauthorised use of card- or disc-shaped proofs of legitimacy and/or data carriers, such as ATM cards, credit cards and flexible discs, comprising a cover- or case-shaped device or the like which has at least one pocket or the like adapted to receive at least a portion of at least one card, disc etc., actuators and control means arranged in said pocket, said control means being adapted to control said actuators and preferably being of the code lock type and comprising one or more means which, when actuated in a certain sequence or in a certain combination, are adapted to control said actuators.

When the present-day type credit cards, which are used as means of payment, fall into wrong hands, they will cause both the card owner and the company issuing the credit cards severe economic damage. Safety programmes proposed and used up to now—e.g. printed stop lists or centralised "on line" stop payment registers—have not proved to be sufficiently effective. Moreover, no solution has been found to the problem of bridging, for the purpose of checking, the frequently long time interval from the point of time at which the true card owner loses his card up to the point of time at which the corresponding information has been entered in a computer file or appears in the stop lists. The time required for distribution of the stop lists, and the risk that such lists are misread or not read at all, must also be calculated.

One object of the present invention is to provide a device which at all times allows the card owner full control of the credit card or the like and which, if the true owner is dispossessed of the card, makes it useless to any other person.

Other types of data carriers, such as flexible discs and the like, may contain information which, if it falls into wrong hands, can cause severe damage both economically and otherwise. Flexible discs with delicate contents are often sent by mail or in some other way between different places of employment, and in such cases, but also through burglary, flexible discs may become accessible to unauthorised persons. With flexible discs and like data carriers, there is a further element of danger in that the disc can be easily copied or made to reveal its contents without the correct receiver noticing this on receipt of the disc. A further object of the invention thus is to provide a device which prevents unauthorised access to the information stored on a disc or the like.

It is previously known to electronically validate credit cards and the like each time before they are used, thereby to prevent improper use. For example, DE-A1 3,131,761 and IBM Technical Disclosure Bulletin, Vol. 12, No. 7, Dec. 7, 1969, p. 969 and Vol. 13, No. 13, Jan. 8, 1971, p. 2140, disclose devices for this purpose. Such devices require, however, that the receiver of the card or data carrier has recourse to electronic equipment indicating whether the correct validating operation has been made, whereas the present invention aims at providing a device by which the card or data carrier is rendered useless.

SUMMARY OF THE INVENTION

The main characteristic feature of the new device is that the actuators comprise means which are activatable when an attempt at gaining access is made without proper actuation of the control means and which, in the event of such an attempt at unauthorised access, are adapted to permanently damage the card, disc etc. and/or the data carried thereon.

BRIEF DESCRIPTION OF THE DRAWINGS

Various embodiments of the device according to the present invention will be described in more detail below, reference being had to the accompanying drawings in which:

FIG. 1 shows from above an embodiment intended for credit cards and the like;

FIG. 2 shows the same embodiment as seen from one end;

DESCRIPTION OF THE PREFERRED EMBODIMENT

Figure 3:
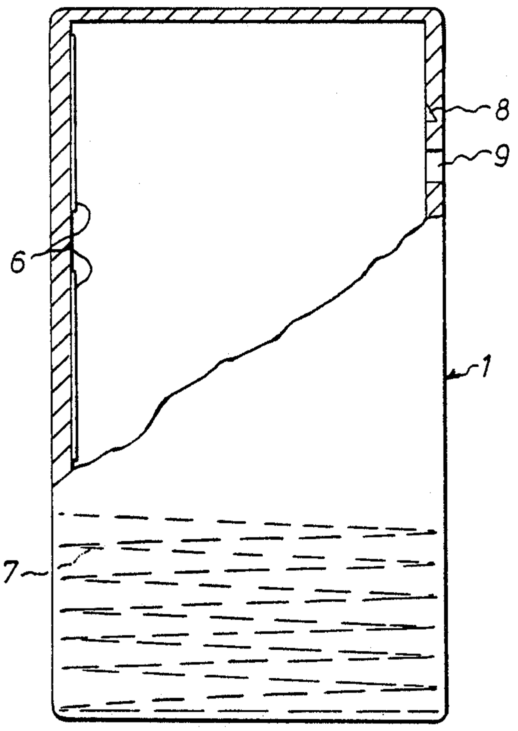
FIG. 3 shows, partly in section, the outer casing from above.
Figure 5:
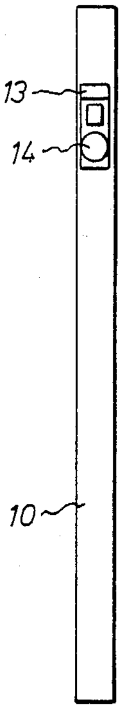
FIG. 5 is a lateral view of the inner part.

A mechanical embodiment (not shown) of the device may comprise a cover- or case-shaped card holder having at least one insert opening which is adapted to the cross-section of the credit card. The card holder may accommodate a plurality of actuating or marking means provided with marking or cutting edges and activated by external control means, and preferably eccentric holding means which allow insertion of a card into the holder, but which on extraction of the card urge it against the side where the marking means are positioned. By setting correctly the control means which may consist of laterally displaceable buttons, the edges of the actuating or marking means can be moved away from the card, whereupon the authorised user can readily extract the card. However, if an attempt at extracting is made without the correct setting, the surface of the card will be cut or scratched. As a result of the damage to the card, the receiver will notice immediately that the card is being used without authorisation.

An embodiment operating with chemical substances may, like the one described above, consist of a cover- or case-shaped card holder, the interior of which accommodates one or more ampoules containing ink or some medium otherwise affecting the plastic card. By setting correctly the control means, the ampoules can, in the same way as previously described, be removed from the path of the card as the card is extracted, whereas in connection with unauthorised use an attempt at extracting will result in the ampoules etc. being crushed and discolouring or damaging the card.

The mechanical and chemical embodiments can be made up and constructed in many other ways.

In a further, partly mechanical embodiment, a case-shaped container may be provided with one or more permanent magnets which are adapted to be displaced by the control means, and here the device may be designed such that correct setting of the control means causes the permanent magnets to be removed from the magnetic stripe of the card, but in connection with unauthorised use, the permanent magnets are in such a position that they will permanently damage the magnetic stripe when the card is extracted.

The embodiment shown in FIGS. 1–5 comprises an outer casing 1 and an inner part 2.

The outer casing is completely closed except for a slot-shaped opening 3 at one end. One side of the outer casing is provided with a keyboard 4 and a display window 5 for a minicalculator of the very flat type. Here, the keyboard also serves as control means for actuating an encoding unit. On one side, the interior of the outer casing is provided with contact rails 6 adapted to be in electric contact with sheet metal contacts situated in the inner part. The contact rails are connected with a protective winding or protective net 7 comprising a large number of windings of thin conducting wire integrated with the material forming the outer casing. Any damage to the outer casing causes a control circuit to open or close, whereby the safety device is triggered.

One long side of the outer casing is provided with a hook-shaped recess 8 and a through hole 9, the function of which will be described below.

The inner part 2 comprises an open frame 10 and an end portion 11 accommodating the locking means and the electronics unit. The frame 10 is adapted to hold a plurality of credit cards or at least one credit card when the inner part is received in the outer casing 1, a corner of the credit card being indicated at 12.

Loops of thin conducting wire (not shown) are integrated with the frame 10 like in the outer casing, and any damage to said conducting wire causes triggering of the safety device.

The inner part 2 is locked mechanically in the outer casing 1, but the locking is controlled by an electronic component which in turn is controlled by the keyboard 4.

The mechanical locking means comprises a locking hook 13 engaging the recess 8 in the outer casing and being actuated by a push button 14 which is moving in the opening 9 in the outer casing 1. The locking hook and the push button are arrested in normal position by a locking arm 15 which in its nonactuated state prevents the button 14 from being pressed. The locking arm is operated by an electromagnet 16 or the like which, when activated, causes the locking arm to pivot away from its position arresting the push button 14 and the locking hook 13, provided however that the correct code has been entered on the keyboard 4.

The end portion 11 of the inner part accommodates also the safety device proper which, as shown, may comprise a knife means 17 connected with a piston-shaped disc 18 which may move in a cylinder 19. Behind the disc 18, an explosive composition 20 is arranged which, on initiation, violently presses the disc 18 with the knife 17 out of the cylinder, the knife cutting off, as indicated by a dotted line, the corner of the credit card stored in the device, which consequently makes the card useless in that the receiver immediately notices the damage.

Figure 4:
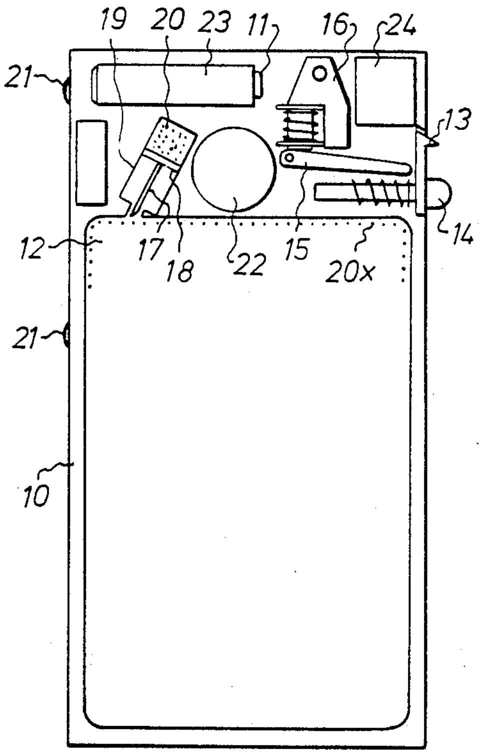
FIG. 4 is a top plan view of the inner part.

Instead of, or in addition to, the knife shown which cuts the card and thus marks it, an explosive composition or the like can be caused to initiate a strand 20*x* indicated by a dotted line in FIG. 4 and consisting of an inflammable, such as gun powder, magnesium or like composition which generates intense heat and deforms the edge portion of a card stored in the device and/or visibly damages the card.

The major part of the electronics unit is accommodated in the outer casing and integrated with the minicalculator, for which reason the number of the conductive means required between the mutually movable parts may be reduced to two, i.e. the sheet metal contacts 21.

In addition to the above-mentioned items, the inner part comprises batteries 22 and 23, respectively, for the electromagnet 16 which, via an amplifier 24, is controlled from the keyboard 4, and for the initiating means for the explosive composition, which is controlled by the control windings sensing any damage.

Embodiments adapted to store flexible discs and the like can largely be designed in the same way as those intended for credit cards and the like, that is to say with an outer casing 1 receiving an inner part 2 which, by means of a frame-shaped portion, defines a storage space. The outer casing can be designed to be shielding so that its contents cannot be affected from outside. Flexible discs are usually enclosed by an envelope-like, rigid case, for which reason the marking means described above are not particularly suitable, since an unauthorised user would hardly bother about any damage to the case.

Therefore, embodiments of the invention intended for flexible discs and the like are provided with means for erasing or permanently destroying information stored on the disc, and this can be done by a means which generates a strong electromagnetic or electric current impulse. In the same way as mentioned above, the magnetic impulse can be provided by means of a permanent magnet which in its resting position is removed to a shielded space in the end portion of the inner part, said permanent magnet being moved closer to the flexible disc when activated by, for example, a spring means.

Figure 6:
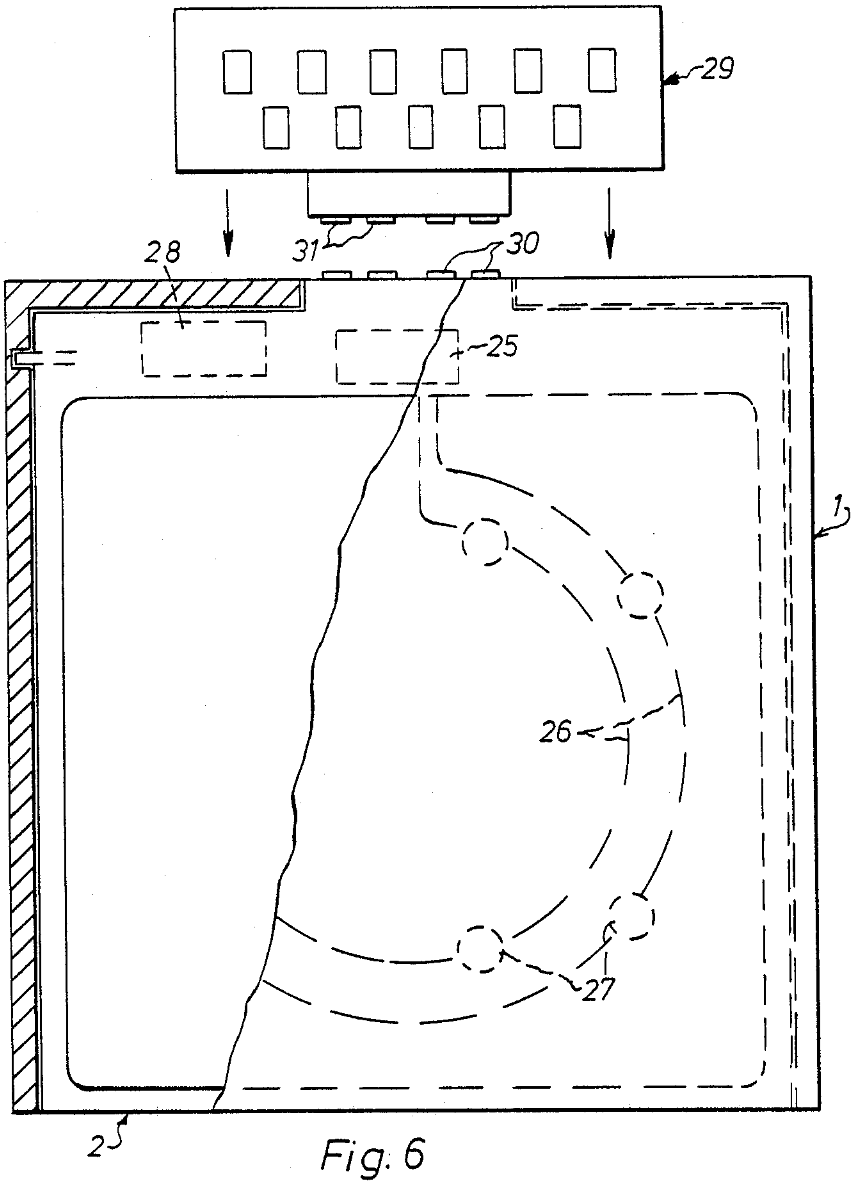
FIG. 6 shows, partly in section, an embodiment intended for a flexible disc.

In the embodiment shown in FIG. 6, the electric current impulse is provided by a rechargeable capacitor 25 or the like and a loop 26 on both sides of the space for the flexible disc. The loop 26 comprises a plurality of coils 27 situated in strategically chosen positions. The loop with its coils is suitably designed as a so-called printed circuit card and is fully integrated with the casing 1 such that its position cannot be determined from outside.

Also in this instance, the casing is of course provided with a protective winding of the same type as the protective winding 7 in the embodiment described above.

The function is controlled by an electronics unit 28 which in the embodiment shown is actuated by a separate control unit 29 via the contact means 30, 31. The control unit 29 which is provided with a suitable source of current, comprises an encoding unit or the like which enables and disables the safety device. Since the transmitter and the receiver are each provided with a control unit which, so to say, serves as a key, the safety device is always activated during transport. Any attempts at tampering or gaining access will thus cause the contents to be erased or otherwise made useless.

The invention is not restricted to the above disclosure but can be modified in several ways within the scope of the appended claims.

We claim:

1. A device for preventing unauthorised use of card- or disc-shaped proofs of legitimacy and/or data carriers, such as ATM cards, credit cards and flexible discs, comprising a cover- or case-shaped device (1) or the like which has at least one pocket or the like adapted to receive at least a portion of at least one card, disc etc., actuators and control means (4) arranged in said pocket, said control means being adapted to control said actuators and preferably being of the code lock type and comprising one or more means which, when actuated in a certain sequence or in a certain combination, are adapted to control said actuators, characterized in that said actuators comprise means (17, 20*x*, 27) which are activatable when an attempt at gaining access is made without proper actuation of said control means, and which, in the event of such an attempt at unauthorised access, are adapted to permanently damage the card, disc etc. and/or the data carried thereon.

2. Device as claimed in claim 1, characterised in that said actuators comprise mechanical means (17) which, in the event of an attempt at access without proper actuation of said operating means, are activatable and which, when such an attempt at unauthorised access is made, are adapted to permanently mechanically damage said card, disc etc.

3. Device as claimed in claim 1, characterized in that said actuators comprise containers for substances which, in the event of an attempt at unauthorised access, i.e. without preceding proper actuation of said control means, are activatable, or like substances affecting said card.

4. Device as claimed in claim 3, characterized in that said activatable substances (20*x*) are pyrotechnical and, under the action of heat, affect said card, disc etc.

5. Device as claimed in claim 4, characterized in that said activatable pyrotechnical substances (20), under the action of mechanical means (17), are adapted also to mechanically affect said card, disc etc.

6. Device as claimed in claim 1, characterized in that said actuators comprise at least one magnet or the like adapted, when an attempt at removing said card is made without proper actuation of said control means, to negatively affect the information magnetically stored on said card or disc.

7. Device as claimed in claim 1, characterised in that said control means are adapted to control electronically operating actuators (27) which, when activated, will damage the information available on said card.

8. Device as claimed in claim 1, characterized in that said cover- or case-shaped device is adapted to store at least one card, disc etc.

* * * * *